Oct. 7, 1924.
D. C. KLAUSMEYER
FRICTION REVERSER
Filed Feb. 22, 1921     2 Sheets-Sheet 1
1,510,623
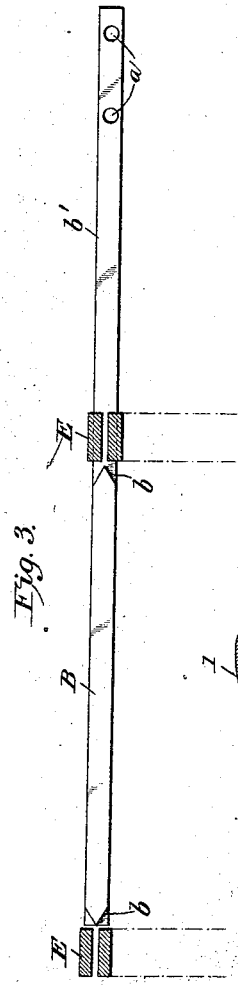
WITNESS
L. E. Fischer.
INVENTOR
David C. Klausmeyer
BY
Albert P. Nathan
ATTORNEY Oct. 7, 1924.
D. C. KLAUSMEYER
1,510,623
FRICTION REVERSER
Filed Feb. 22, 1921
2 Sheets-Sheet 2
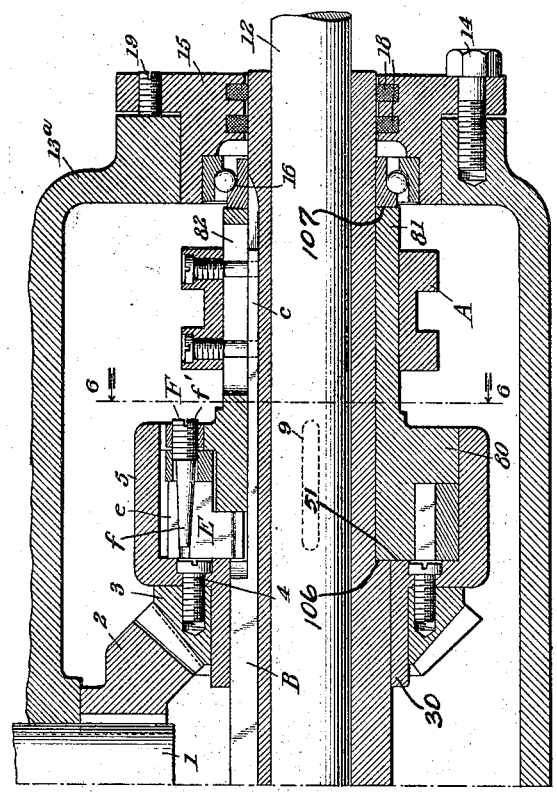
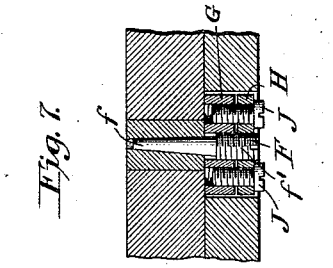
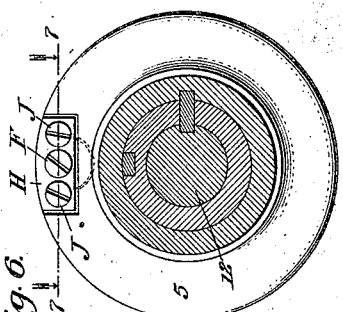
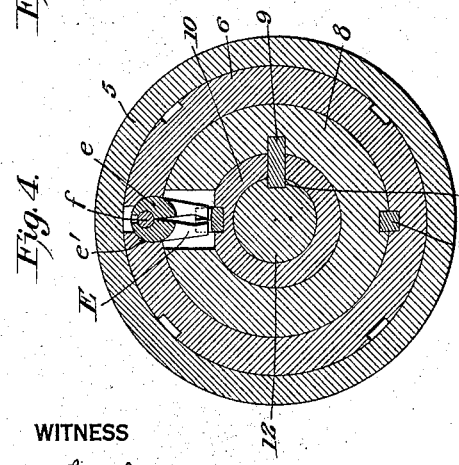
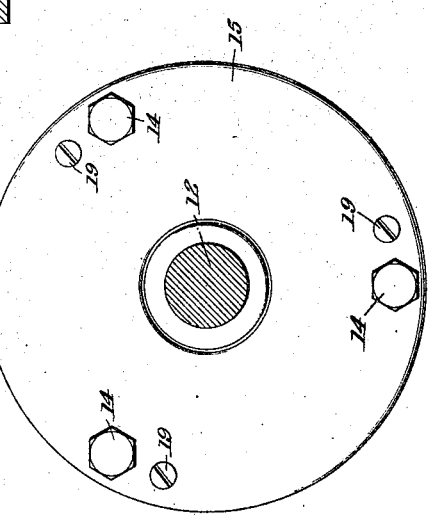
WITNESS
L. E. Fischer.
INVENTOR
David C. Klausmeyer
BY
Albert F. Nathan
ATTORNEY

Patented Oct. 7, 1924.

UNITED STATES PATENT OFFICE.

1,510,623

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

FRICTION REVERSER.

Application filed February 22, 1921. Serial No. 446,988.

*To all whom it may concern:*

Be it known that I, DAVID C. KLAUSMEYER, a citizen of the United States, and residing at 3638 Burch Ave., Hyde Park, Cincinnati, in the county of Hamilton and State of Ohio, have invented a new and Improved Friction Reverser, of which the following specification is a full disclosure.

This invention deals with motion-reversers of the friction type and it proposes a construction eminently adapted for embodiment in drilling-machines as a so-called "tapping" instrumentality.

It is of paramount importance, in machines of this type, to have the spindle very freely translatable and in all positions to be quickly and easily reversible in motion, and the mechanism for enabling this to be achieved must satisfy a variety of exacting desideratums, to wit: (1) the gears must be small and closely nested; (2) they must be so journaled that their initial "pitch" setting will endure for a very long time; (3) the wear of normal-running must admit of being "taken-up" by suitably provided adjustments as to various parts of the mechanism; (4) the right end left gears must be so mounted as to reduce to a minimum their tendency to become mis-aligned through wear or defective design; (5) said gears must be protected from direct contact with the spindle which, by reason of its material and its compound motion (translation as well as rotation) is not conducive to nonwear of small surfaces; (6) said gears must be so mounted as to prevent any "wobbling" and should each be carried by a single member to ensure accurate alignment and admit of ready replacement; (7) said member should be adjustably journaled in the casing to compensate for the normal wear of its bearings, and said member should afford a very ample surface in direct contact with the spindle to ensure accuracy; (8) the clutches must be so located as to be immediately effective on the gears without interfering with their "close-up" relation; (9) the instrumentality for operating the clutches must be structurally compatible with each of the above desideratums and must be simple, effective, and located where room is most available without increasing the bulk of the mechanism as a whole; (10) the continuous running parts should all be contained within a closed casing so as to run in a bath of lubricant and be protected from grit or the possibility of running dry, and (11) adjustable means for regulating the distance of each gear independently from the common central gear to secure a correct mesh.

This invention has accordingly in objective the provision of a mechanism adequately meeting each of the above specified requirements and it therefore proposes a structural organization which may, in two of its various embodiments, be exemplified by way of the annexed illustrative drawing, in which;

Fig. 1 is a longitudinal section. Fig. 2 is a transverse section through line 2—2 of Fig. 1. Fig. 3 is a plan of the isolated clutch-actuating key. Fig. 4 is a section through 4—4 of Figs. 1 and 2, showing the expansible friction-shoe and operating levers. Fig. 5 is an end view of the adjustable end-wall of the casing. Fig. 6 is a section through line 6—6 of Figs. 1 and 2 showing one of the various species of ring-expanders which may be utilized as an element of this general organization. Fig. 7 is a fragmentary section through line 7—7 of Fig. 6 showing further details of the adjustable lock-nut for taking up wear of the friction elements.

A modification, whereby, through a slight extension in the length of the casing, the shiftable clutch-controlling collar is wholly encased, is shown in partial section by Fig. 8.

The mechanism essentially embodies two shafts 1 and 12 arranged preferably in the same plane to avoid the use of "skew" gears; said shafts being here shown also at right angles so as to admit of the use of duplicate bevel-gears for transmitting either forward or reverse motion at the same rate. Shaft 1 may be regarded as accompanying a fixed position in space, whereas shaft 12 is freely shiftable in its axial direction into such positions as the work demands; said shaft serving as a spindle.

A rigid frame 13 provides appropriate bearings whereby either directly or indirectly the shaft 1 and the spindle 12 will be maintained accurately at all times in the aforesaid relations. This rigid frame 13, in the most advantageous embodiment of this invention, being continuous to form a closed casing or container adapted to enclose all continually running elements together with a bath of lubricant and likewise prohibit the access of dust or grit to the various bearing surfaces. It will be especially noticed that, owing to the characteristic arrangement and relationship of the various elements and owing also to certain structural peculiarities in the clutch-controller, it has become possible to reduce the bulk of this casing and make it notably compact, thereby increasing its general rigidity while reducing its cost. Furthermore, the advantages of this condensed unit will be recognized by builders of drilling-machines by reason of the superiorities in the general design of such machines afforded by the utilization of this compact unit.

The spindle 12 passes through the bore of an elongated sleeve 10 which is journaled in the opposite end-walls of the casing 13 and which, by reason of the distance between these journals, is thereby maintainable in very accurate axial relationship with the shaft 1 while, at the same time, serving to preserve an equally accurate relation with the spindle 12 and yet afford a free translation of the latter. The spindle is provided with a spline-groove throughout its length or for such portion thereof as the extent of the translation may require; this groove being shown best by Figs. 4 and 6 wherein is indicated the portion 11 of a suitable key which is secured to the sleeve 10 and engages the spline-groove in all positions of the spindle 12 to cause it to rotate as a unit with the sleeve.

The elongated sleeve 10 may be adjacent its ends, reduced or otherwise formed to provide the annular bearing extensions 101 and 102 (Fig. 1) or the extension 103 (see modification of Fig. 8) which project into or through, as the case may be, the opposite end-walls of the casing so as to admit of being journaled thereto either directly or through the agency of ball thrust-bearings 16, which, as will subsequently appear, serve to limit the outermost positions assumed by the gears under the pressure of tooth-contact, while yet, in a desirable embodiment of the invention, affording a very slight longitudinal creep or float of the sleeve. As shown, the end-walls of the casing are preferably provided with annular recesses containing packing-rings 18 bearing against the extensions 101, 102 or 103 to prevent escape of lubricant. Undue endwise play of the sleeve 10 is prohibited by means of shoulders 104 and 105 which, as shown by Fig. 1, when the movement is sufficient to take up the clearance, will abut directly against a bearing afforded by the construction of the end-walls of the casing. In the modified exemplification of this invention shown by Fig. 8 the shoulder on the sleeve proper located at 106 and the end-thrust is taken by a part which will presently be detailed and which, being rigidly keyed to the sleeve, is made a component part thereof and, accordingly, provides at 107 a shoulder corresponding to the shoulder 105 depicted by Fig. 1. The distance between the shoulders 104 and 105 or 104 and 106, will in practice preferably be slightly less than the distance between the ball-bearings in Fig. 1, or the remote ball-bearing and the part in Fig. 8, so as to permit a very slight creep of the the sleeve endwise.

The clutch-elements are carried on or positioned with relation to duplicate annular blocks 8 as shown by Fig. 1. In the modification of Fig. 8, one of these blocks is provided with a sleeve-like extension 81 for supporting the shiftable collar, as will presently appear. In other respects, these blocks 8 and 80 are alike.

Referring to Fig. 1, it will be seen that each of the blocks 8 is provided with a bore 82 of uniform diameter and of sufficient size to receive the sleeve 10 but not so tightly as to prohibit endwise movement of the blocks on the sleeve. The sleeve and each of the blocks are caused to rotate together by the key 9, shown best by Fig. 4, but it is to be noted that the key is somewhat less in length than the slot or keyway in each of the blocks 8, thereby permitting some end play as aforesaid. At the left-hand end of Fig. 1, the sleeve presents an unslotted portion, and the corresponding block rests on this portion and also somewhat overlaps the end of a slot or keyway in the sleeve; whereas the block 8 at the right-hand side of Fig. 1 rests on the periphery of the sleeve and extends over without protruding into a keyway provided by the sleeve for a purpose to be hereinafter specified. At this point, it may be stated that these blocks, while being normally free with respect to the bevel-gears interfitting therewith, act as abutments so to speak for limiting the outward movement of such gears under the pressure of the teeth meshing with the common gear. Likewise, the gears act in a converse capacity with respect to the blocks, this result being attained by the abutting surfaces 50, indicated on Fig. 1 and by the abutting surfaces 51 indicated on Fig. 8 with respect to the block 80, there being normally no clearance at these points when the gear in question is operating under a load. The outward movement of the blocks 8 in the form shown by Fig. 1, and likewise of the block 80 in the form shown by Fig. 8, is limited positively by means of the endwise abutment of the blocks against bearing portions provided by or forming part of the end-walls of the casing 13. In the case of Fig. 1 the contacting surfaces are denoted by 160, and by 107 in Fig. 8.

By reason of the aforesaid construction, it will be perceived that the correct meshing of the teeth of the gears may be positively insured by locating the surfaces 160 in the case of Fig. 1 (107 in the case of Fig. 8) at the correct distance from the center line of the shaft 1 which conveys motion to the drill spindle.

The correct distance may, of course, be secured by an initially correct formation of the end walls of the casing, or the abutting elements presented or carried thereby, but inasmuch as some structural difficulties may be encountered in doing this as a matter of practical workmanship, and inasmuch as the continual running of the parts must in time produce some wear with a corresponding error in the meshing of the gears, this invention in its preferred form provides features of adjustment which may now be described. The end walls of the casing are shown in the form of caps or plates 15 which telescope into appropriate openings at the opposite ends of the main casting of the casing 13. These caps may be adjusted inwardly, carrying with them the bearing and abutment elements 16; this adjustment being effected by means of the bolts 14, shown in Figs. 1 and 5. These bolts are preferably symmetrically disposed and closely associated with each bolt is a stop pin 19 which is screw threaded through the flange of the end wall or cap 15 so as to admit being adjusted and, by means of its endwise abutment with the main frame of the casing, positively limit the inward movement of the end plate 15. It will be seen that, by this arrangement, the gears 5 may each be brought and maintained notwithstanding wear in correct meshing relation with the common gear 2. By suitably adjusting one or more of the bolts 14, it will likewise be seen that the alignment of the sleeve may be ensured with precision.

The reversing gears proper 3 are shown secured by screws 4 to body portions 5 which provide not only journals whereby the gears may rotate smoothly and accurately on the sleeve 10, but also provide interior annular braking surfaces adapted to be frictionally engaged by the expansible shoes to be hereinafter described. The journal portions for the gears 3 are indicated by 30 on the drawings and extend a sufficient distance along the sleeve 10 toward the center line of the shaft 1 to provide very ample bearing surfaces, whereby the gears may be restrained against any wobbling action whatsoever and whereby they will be maintained in absolute alignment by reason of being both mounted on the same rigid element, to wit, the sleeve 10.

As will be understood, the gears 3 are continually rotating in opposite directions freely on the sleeve, but suitable clutch elements are provided whereby either one or the other of these gears may be clamped to the blocks 8 thereby transmitting motion from the splined shaft 12 to the appropriate gear 3 and causing it to act as a driver in propelling the common gear 2. It is, of course, immaterial whether the shaft 12 be the initial driving element and the shaft 1 the ultimately driven element, or conversely. It is likewise immaterial what particular type of clutch is utilized for the purpose of connecting the block 8 with the brake surface of the adjacent gear. The drawings, however, depict a form of clutch which has been found to be simple and effective. This clutch comprises a contractile annulus 6 in the form of a split ring which normally clasps a peripheral seat at one side of the annular block 8; being non-rotatably keyed thereto by means of the key 7 shown in Figs. 1 and 4. The ends of the split ring 6 are provided with arcuate seats $a'$ in which are seated the semi-circular parts $c$ forming bosses extending from the clamp levers E. Located eccentrically with relation to the semi-circular surfaces aforesaid, each of the levers E is provided with a conical seat riding on the taper bearing portions $f$ extending from the pivot pin F, as shown best by Fig. 1. This pivot pin has a screw threaded portion $f'$ engaging a threaded aperture in a floating plate G, which rides in a suitable recess provided by a flange of the block 8. This is shown best by Figs. 6 and 7. In order that the adjustment of the pivot pin F may be permanently maintained, a plate H in the nature of a nut lock is provided. This plate H is also screw threaded to the part $f'$ of the pivot pin F and it is capable of being clamped thereto so as to prevent rotation of the pin F by means of clamp screws J having their ends screw threaded into apertures in the floating plate G; the plates G and H being adapted to float together as a unit when the ends of the split ring 6 are expanded as will be presently described.

The instrumentality for operating the ring expanding mechanism comprehends a longitudinal key in the nature of an elongated bar fashioned somewhat as shown by Fig. 3. This key is denoted by B and provides two wedge like portions $b$ each adapted when the key is moved appropriately in a longitudinal direction to engage an arm of the expanding lever E and move it sufficiently to effect an expansion of the split brake shoe 6. This key rides in a splined groove starting at or near one end of the sleeve, as shown at the left of Fig. 1, and extending to or near the other end of the sleeve as shown at the right of Fig. 1, or as shown in the modification depicted by Fig. 8. In the form shown by Fig. 1, the sleeve extends exteriorly beyond the end wall of the casing and the exterior portion of the sleeve carries a shiftable collar which, by means of screw studs entering holes a in the extension b' of the key, is permanently attached to said key so that, by shifting the collar A, the key may be longitudinally shifted to actuate either one or the other of the clutches. In the modified form shown by Fig. 8, the shiftable collar is contained wholly within the casing which is indicated by 13ª and is sufficiently extended on one side of the center line of the shaft 1 to afford the room necessary for the location and play of the shiftable collar. This collar, as in the case of Fig. 1, likewise rides out of contact with the splined shaft 12; being in this instance carried by the sleeve like extension of the block 80 which, by reason of being keyed to the sleeve, becomes virtually a component part thereof. This extension is provided with a slot 82 in registry with the splined groove in the sleeve; thereby enabling the stud screws in the collar to project into engagement with the extension c of the key B, in a manner similar to that described in connection with Fig. 1. The mounting of the shiftable collar A directly on the sleeve, or on a component part thereof, as shown by Figs. 1 and 8, is an important characteristic of this invention, whether the collar be located within or without the casing, since thereby the wear of the bore of the collar is reduced to a minimum and any tendency to inadvertently shift the collar through the translation of the shaft 12 is avoided. It is to be noted that in the case of each form illustrated, the key extends entirely through the block 8 or 80, as the case may be, and then through the bore of the adjacent gear, and then through the bore of the remote gear, and finally terminate adjacent the clutch for operating the latter, thereby producing a very compact self-contained arrangement entirely devoid of external connecting links or rods; the avoidance of which contributes materially to the closely nested relationship of element constituting the arrangement afforded by this invention.

It will be readily understood that various details may be altered without departing from this invention and that certain elements herein illustrated may likewise be replaced by equivalents thereof within the intended scope of the following claims.

I therefore claim as new and desire to secure by Letters Patent:

1. A friction reverser combining an elongated closed casing; an elongated sleeve terminating at one end in journaled relation with said casing and having its other end extending through and being journaled to an end-wall of said casing; a collar supported directly on the protruding end-portion of said sleeve to rotate therewith, said collar being located adjacent exterior face of said end-wall of said casing and adapted to be shifted axially on said sleeve; two conversely arranged clutches spaced apart and supported by said sleeve immediately adjacent the interior faces of the opposite end-walls of said casing; two bevel gears located between said clutches in immediate proximity therewith respectively; a single bevel-gear continually meshing with said two gears and fixed to the end of a transverse shaft journaled through the side-wall of said casing; a spindle translatable through the bore of said sleeve and splined to rotate therewith; and an elongated key affixed at its outer extremity to said collar and extending therefrom through the end-wall of said casing and entirely through the adjacent clutch and continuing through the bores of said two bevel-gears, said key being provided with spaced clutch-actuating portions to enable either the one or the other of said bevel-gears to be clamped to said sleeve by shifting the collar located externally adjacent the end-wall of said casing.

2. A friction reverser combining a closed casing; an elongated sleeve journaled in the end-walls of said casing; a collar shiftably carried by said sleeve and located adjacent one of the end-walls of said casing; a splined shaft translatably extending through the bore of said sleeve beyond the portion thereof which supports the collar so as to mount said collar independently of said shaft; a pair of gears conversely arranged on said sleeve and connected by an intermediate bevel gear so as oppositely to rotate; clutches arranged adjacent the remote ends of said gears; and an elongated key attached to said collar and extending in splined relation with said sleeve entirely through the nearest gear and its associated clutch, and likewise through the other gear without contacting with either, said key being provided with clutch operating portions to enable it when shifted by said sleeve-supported collar to render either clutch effective.

3. A friction reverser combining an elongated closed casing; an elongated sleeve journaled in the end-walls of said casing and protruding from one end of said casing; a pair of clutches mounted on said sleeve, each clutch being immediately adjacent the corresponding end-wall of said casing; a pair of conversely disposed bevel gears journaled on said sleeve between said clutches; an intervening gear secured to a shaft journaled in a side wall of said casing; a shaft translatably splined to the bore of said sleeve and extending entirely through the latter; a shiftable collar slidably mounted directly on the protruding portion of said sleeve so as to be supported out of contact with said shaft; and an elongated key translatably countersunk in said sleeve and extending from said collar through the end-wall of said casing and thence through the next adjacent clutch and through and clear of the bores of said gears, said key providing clutch operating portions.

4. A friction reverser combining an elongated closed casing; an elongated sleeve journaled at its respective ends in the end-wall of said casing; a shaft translatably keyed to and extending entirely through the bore of said sleeve; a collar located within said casing closely adjacent one end-wall thereof and adapted to be shifted without contacting said shaft; a first clutch mounted on said sleeve adjacent said shiftable collar; a second clutch on said sleeve immediately adjacent the remote end wall of said casing; a pair of conversely arranged bevel gears located between said clutches in immediate proximity therewith; a shaft extending transversely through the wall of said casing precisely midway said gears; an intermediate bevel gear meshing with the pair of gears; and an elongated clutch operating key translatably countersunk in said sleeve and adapted to be actuated by said collar.

5. A friction reverser combining an elongated closed casing; an elongated sleeve journaled in the end walls of said casing; reversing mechanism comprising bevel gears arranged within said casing and carried by said sleeve; and means for adjusting one or more of the journals of said sleeve for the purpose of ensuring a correct meshing of the gears and for compensating for wear.

6. A friction reverser combining an enclosed casing; a sleeve journaled in the end walls of said casing; reversing mechanism within said casing comprehending bevel gears and associated clutches shiftably mounted on said sleeve; an intermediate bevel gear; and means arranged at one end wall of said casing for shifting the adjacent clutch and gear on said sleeve sufficiently to ensure a correct meshing of the gears and to compensate for wear.

7. A friction reverser combining an enclosed casing; an elongated sleeve journaled in the end-walls thereof; said sleeve being shouldered at one end to bear directly against the adjacent bearing portion of the end-wall; reversing mechanism carried by said sleeve and comprehending a pair of clutches and bevel gears therebetween, the gear and clutch remote from the shoulder end of said sleeve being slightly shiftable on said sleeve; a bevel gear intervening between the pair of bevel gears; and means for shifting said mentioned clutch and associated gear to compensate for wear.

8. A reversing-mechanism combining two widely-spaced and conversely-disposed clutch-supporting blocks; an elongated sleeve and a rigid frame cooperating together to support said blocks in coaxial relation and also limit the separation of said blocks, said sleeve being journaled in said frame, and said blocks being secured to rotate with said sleeve; a shaft translatably splined to and extending through the bore of said sleeve; a bevel-gear located close to said sleeve and journaled in said frame transversely thereto; two conversely-arranged gears meshing with said other gear and shiftably mounted in coaxial relation with said sleeve so as to have their retreat from said other gear limited positively by said blocks; means operating in relation with said blocks to permit the limit of retreat of said gears to be altered to compensate for wear; clutch-elements intervening between the respective gears and blocks; an elongated key translatably countersunk in said sleeve to extend outwardly through the bore of one of said blocks and terminate near the adjacent journal of said sleeve; and a collar coaxial with said shaft and located adjacent said journal and adapted to be shifted to translate said key.

9. A reversing-mechanism combining two widely-spaced and conversely-disposed clutch-supporting blocks; an elongated sleeve and a rigid frame cooperating together to support said blocks in coaxial relation and limit the separation of said blocks, said sleeve being journaled in said frame, and said blocks being keyed to rotate with said sleeve; a shaft translatably splined to and extending through the bore of said sleeve; a bevel-gear located close to said sleeve and journaled in said frame transversely thereto; two conversely-arranged gears meshing with said other gear in coaxial relation with said sleeve, one of said coaxial gears being so mounted as to retreat from said other gear, the adjacent block being adapted to cooperate in positively arresting such retreat; means cooperating with said block to determine the limit of said retreat to compensate for wear and restore the correct meshing of the gears; clutch-elements intervening between the respective gears and blocks; an elongated key translatably countersunk in said sleeve to extend outwardly through the bore of one of said blocks and terminate near the adjacent journal of said sleeve; and a collar coaxial with said shaft and located adjacent said journal and adapted to be shifted to translate said key.

10. A reversing-mechanism combining a rigid frame; an elongated sleeve supported rotatably adjacent its end-portions by the opposite wall-portions of said frame; a shaft translatably extending through said sleeve and splined to rotate therewith; two widely-spaced clutch-supporting blocks keyd to said sleeve to rotate therewith; two annular members having sleeve-like hubs journaled on said sleeve and having annular flanges circumscribing said blocks to provide interior braking surfaces, said members being slidable on said sleeve and having their outward thrust resisted by said blocks; clutch-elements intervening between said blocks and members; two bevel-gears respectively supported out of contact with said sleeve by said members; an intervening bevel-gear arranged close to said sleeve in mesh with each of said two bevel-gears, an elongated key translatably countersunk in said sleeve to extend through the bore of one of said blocks into operative relation with the clutch-elements carried thereby; and a collar secured to the outermost end of said key in coaxial relation with said sleeve and adapted to be shifted to translate said key.

11. A reversing-mechanism combining a rigid frame; an elongated sleeve supported rotatably adjacent its end-portions by the opposite wall-portions of said frame; a shaft translatably extending through said sleeve and splined to rotate therewith; two widely-spaced clutch-supporting blocks keyed to said sleeve to rotate therewith; two annular members having sleeve-like hubs journaled on said sleeve and having annular flanges circumscribing said blocks to provide interior braking surfaces, said members being slidable on said sleeve and having their outward thrusts resisted by said blocks; clutch-elements intervening between said blocks and members; two bevel-gears respectively supported out of contact with said sleeve by said members; an intervening bevel-gear arranged close to said sleeve in mesh with each of said two bevel-gears; an elongated key translatably countersunk in said sleeve to extend through the bore of one of said blocks into operative relation with the clutch-elements carried thereby; and a collar secured to the outermost end of said key in coaxial relation with said sleeve and adapted to be shifted to translate said key.

12. In a friction-clutch, the combination of a sleeve, an idle member rotatable about said sleeve, said idle member comprising a bevel-gear and a clutch member, a second clutch member mounted about said sleeve and connected thereto so as to rotate therewith, clutch means for operatively frictionally connecting said second-named clutch-member and said idle member, a clutch operating collar shiftable lengthwise of said sleeve, a bearing for said sleeve, said bearing located between said collar and said second-named clutch member, and a clutch actuating bar, one end of which is connected with said collar and the other of which is provided with a clutch operating portion, said bar translatably countersunk in said sleeve and projecting through said bearing for permitting free rotation of the sleeve, whereby said idle member may be engaged by the clutch means and caused to rotate with said second-named clutch member.

In witness whereof, I hereunto subscribe my name, as attested by the two subscribing witnesses.

DAVID C. KLAUSMEYER.

Witnesses:
  AUG. H. TUCKTER,
  MAURICE MUELLER.